Aug. 30, 1938.    I. MARTELLI    2,128,425
TRANSMISSION GEARING FOR VEHICLES AND THE LIKE
Filed Sept. 10, 1936    3 Sheets-Sheet 1
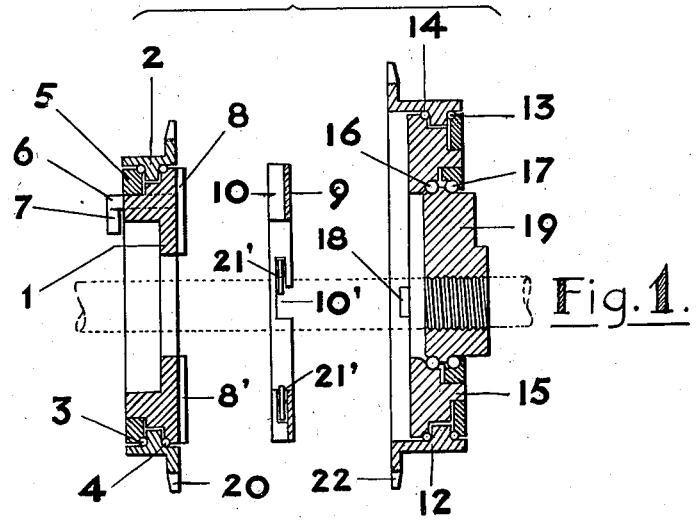
Fig.1.
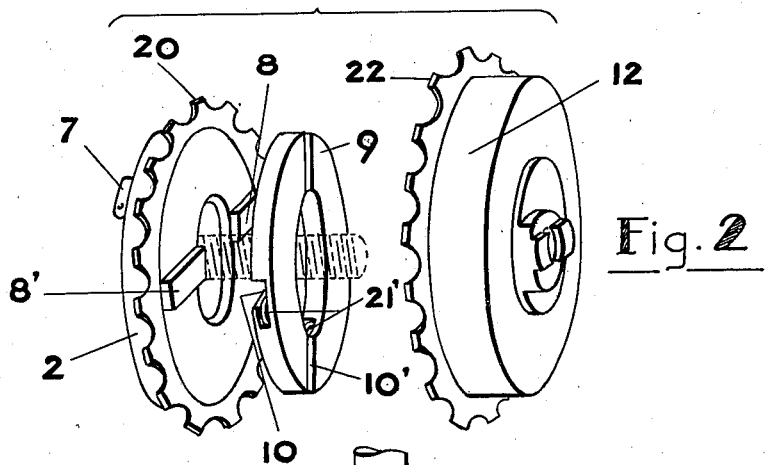
Fig.2.
Fig.3.
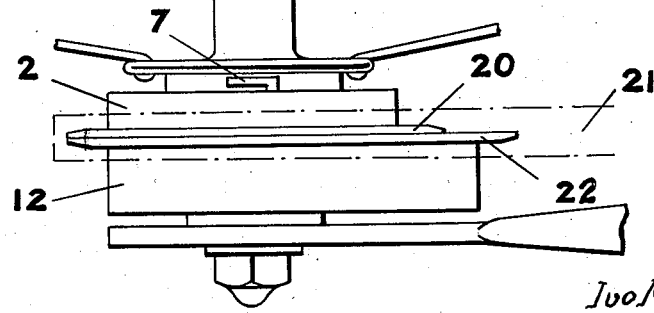
Inventor:
Ivo Martelli
per:
Adolph Zimmerman
attorney

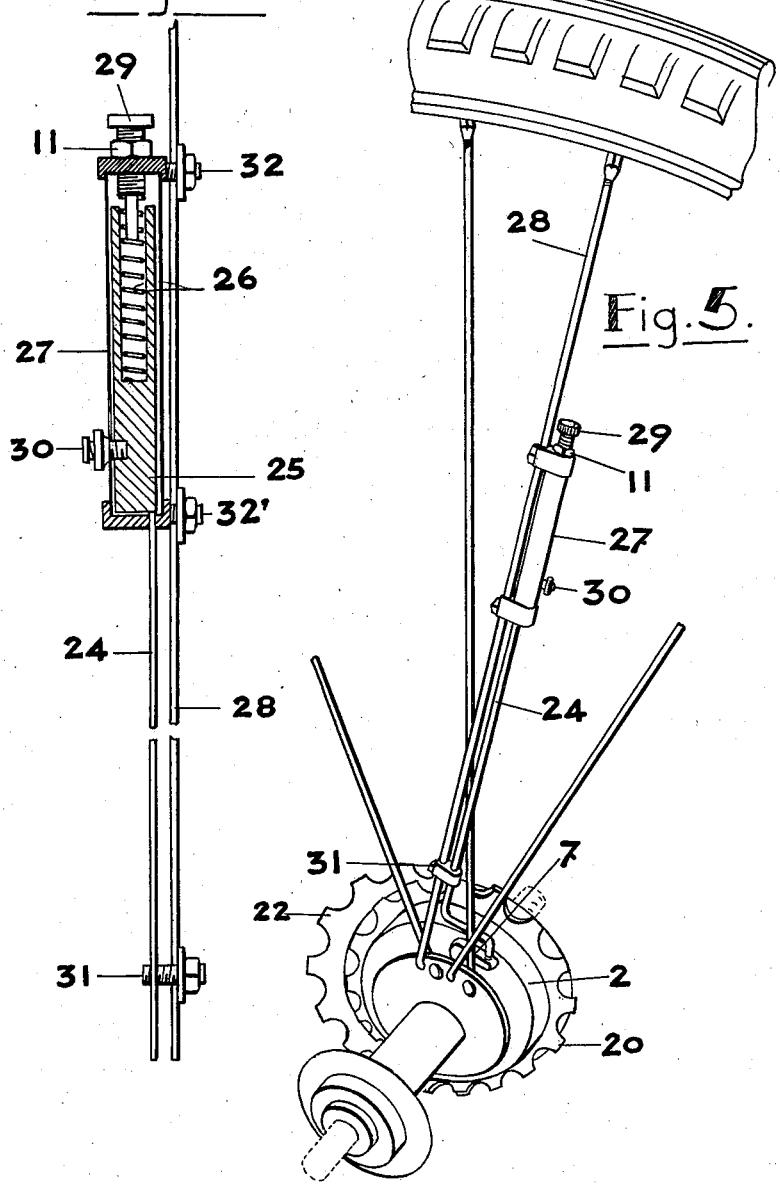

Aug. 30, 1938.  I. MARTELLI  2,128,425
TRANSMISSION GEARING FOR VEHICLES AND THE LIKE
Filed Sept. 10, 1936   3 Sheets-Sheet 3
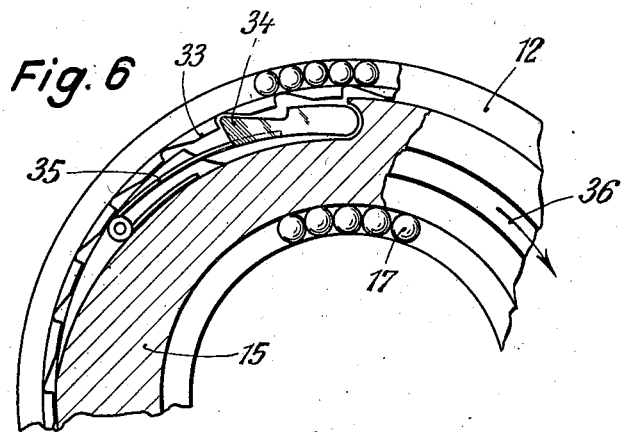
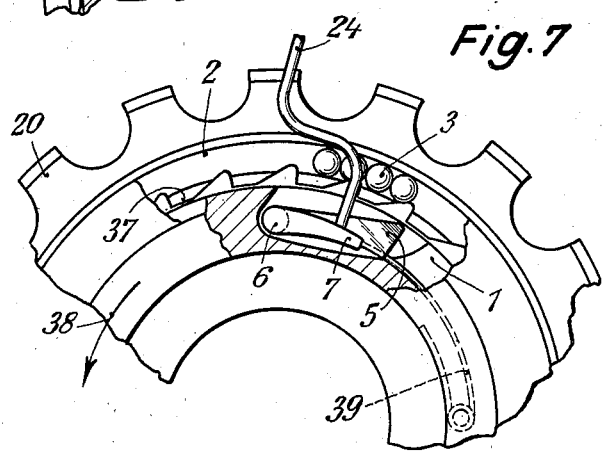
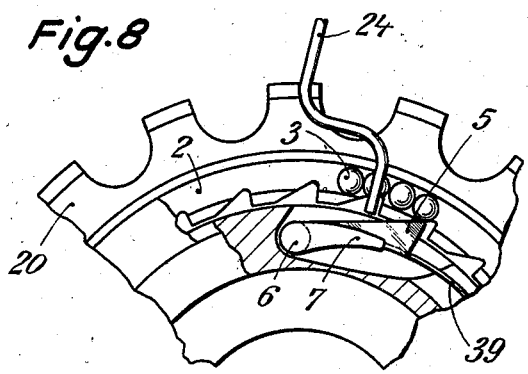
Inventor:
Ivo Martelli Patented Aug. 30, 1938

2,128,425

UNITED STATES PATENT OFFICE 2,128,425

TRANSMISSION GEARING FOR VEHICLES AND THE LIKE

Ivo Martelli, Parma, Italy

Application September 10, 1936, Serial No. 100,101
In Italy September 12, 1935

9 Claims. (Cl. 74—243)

This invention refers broadly to transmission means for vehicle driving wheels and the like in which the transmission is generally effected by a flexible driving and operating agent, preferably a chain drive or the like, and among other important uses and advantages it refers to novel means of increasing the variety of combinations of speed and power transmission in a dependable, quick and easy manner. In its broad aspects the invention makes use of two gear wheels which may be suitably guided and which correspond to two ratios or transmitting relations selected at the discretion of the operator, the said wheels being arranged at such close proximity to each other that their teeth are engaged by the same link or strap of the driving chain. As a further important object the feature should be mentioned that the gear-engaging circles of the wheels make contact with each other at the most rearward point relatively to the forward movement of the wheels and in this position the two tooth sections of the respective wheels complementally constitute a full tooth and effect a coupling between the wheels which are in engagement with the cross frame, while one of the wheels is provided with an eccentric bore. The sections of wheel casings form free-wheels and operate in such a manner that the smaller wheel is actuated by means of a suitable coupling. Said coupling means may be operated by hand or by mechanical switching and operating members adapted to couple and uncouple the relatively smaller wheel in accordance with the speed of the leading wheel or runner. This mechanism may be locked in one or the other relative position, so that only one of the two transmission wheels will operate.

Fig. 1 is an exploded view of the combination of two gear wheels in horizontal section arranged separately;

Fig. 2 is a perspective view illustrating the transmission gearings;

Fig. 3 is a plan view of the transmission means;

Fig. 4 shows the automatic switching and adjusting means by way of exemplification;

Fig. 5 shows the transmitting means mounted on the wheel with the switching means according to Fig. 4;

Fig. 6 is a view in section of one gear wheel showing its free wheel coupling;

Fig. 7 is a view in section of the second gear wheel in one position of its free wheel operation; and Fig. 8 is a view in section of the second gear wheel in another position of its free wheel operation.

The illustrated gear comprises a pair of sprocket wheels 2 and 12 which are of different diameters and provided with equally pitched sprocket teeth 20 and 22 respectively. The two wheels are supported in juxtaposition in contact with each other and in axial parallelism so that the teeth of one wheel will be in register with the teeth of the other wheel at one portion of the circumference, as shown in Fig. 3. The teeth of one wheel are complementary to those of the other wheel, and both sets are engaged at the registering portion of the wheels by a chain 21 which thus rotates the two wheels together at different speeds.

The small wheel 2 is mounted by means of ball bearings 3 and 4 on a driven member 1 which is screwed on to the hub of a road wheel. The larger wheel 12 is mounted by means of roller bearings 13 and 14 on a supporting ring 15, and the latter is in its turn mounted by means of roller bearings 16 and 17 on a boss 19 which occupies an eccentric position on the axle about which the wheel hub turns. Between the ring 15 and the member 1 a rotatable coupling disc 9 is arranged. At one side of the disc 9 there are radial grooves 10 for sliding engagement with corresponding keys 8, 8' on the driven member 1. At the other side of the disc there are similar grooves 10' for engagement with keys 18 on the ring 15. The grooves 10 are at right angles to the grooves 10' and thus allow the disc to occupy a floating position between the ring 15 and the member 1, these elements being compelled by the disc to move in unison. The friction produced by the movement of the keys 8, 8' and 18 in the grooves 10 and 10' of the disc 9 is diminished by the insertion of friction rollers 21' in corresponding slots in the groove walls. The rollers 21' need be inserted on one side only since any considerable frictional force can only arise from the drive and this always acts in one and the same direction. While the ring 15 is freely rotatable on the boss 19, the wheel 12 engages the ring 15 by means of a free-wheel coupling so that it can impart rotation thereto in one direction of movement. For coupling the wheel 2 to the driven member 1 a pawl 5 is provided which is secured to a shaft 6 mounted in the member 1 and which is controlled by a crank 7. When the pawl is in engagement with the wheel 2, the later will impart motion to the road wheel as well as to the ring 15, the rotation of the wheel 12 being controlled by the driving chain. When the wheel 2 is disengaged from the member 1, the latter and the ring 15 will rotate independently of the wheels, and if the wheels are rotated by means of the driving chain the member 1 will be driven through the medium of the wheel 12 and its free-wheel coupling.

In Figs. 6, 7 and 8 the free wheel operation of the wheels is clearly shown. In Fig. 6 is illustrated the free wheel operation of the sprocket wheel 12. As mentioned hereinabove the sprocket wheel 12 is mounted on roller bearings 13 and 14 while the supporting ring 15 is itself mounted on roller bearings 16 and 17. The sprocket wheel 12 is provided with inner teeth in the form of ratchet teeth 33 with which can engage a pawl 34 mounted in the ring 15 and subjected to the action of a spring 35 also mounted on the supporting ring 15. If the wheel 15 moves in the direction of the arrow 36 faster than the wheel 12 then the pawl slides over the ratchet teeth 33 so that no connection is formed between the wheel 12 and the ring 15. If, however, the wheel 12 is driven in the direction of the arrow 36 without the ring 15 having the tendency to move more rapidly than the wheel 12, then one of the ratchet teeth 33 engages with the pawl 34 which is urged by the spring 35 into one of the notches located between the teeth and thus wheel 12 is coupled with the ring 15 from which the drive is transmitted through the disc 9 to the wheel hub.

The sprocket wheel 2 is, according to Fig. 7, provided in a similar manner with inner teeth in the form of ratchet teeth 37. The wheel 2 rotates, as described above, on ball bearings 3 and 4, and thus runs freely on the member 1 which is firmly screwed to the hub so long as the pawl 5 is not engaged in any notch against one of the ratchet teeth 37. If the member 1 rotates in the direction of the arrow 38 more rapidly than the wheel 12, for example when the driving chain is stationary, then the pawl 5 slides past under the inclined faces of the teeth 37. If, however, the member 1 is driven, the wheel hub consequently being driven by the sprocket wheel 2, the member 1 does then not move faster than the sprocket wheel 2 and due to the action of the spring 39 which has the same effect as the spring 35 on the pawl 34 for the sprocket wheel 12, the pawl 5 then falls into one of the notches against a ratchet tooth 37 so that the member 1 becomes coupled to the sprocket wheel 2 (Fig. 8).

It is to be noted that the view in section of the sprocket wheel 12 (Fig. 6) and the sectional view of the sprocket wheel 2 (Fig. 7) are shown as viewed from a point between them so that the directions of rotation of the driven parts according to arrow 36 (Fig. 6) and arrow 38 (Fig. 7) appear to be opposite although these rotations are actually in the same direction.

In order to enable the pawl 5 to be switched out as desired so as to interrupt the drive from wheel 2 which is then transmitted from the more slowly moving wheel 12 to the hub by pawl 34, ring 15, disc 9 and member 1, the crank 7 as well as the member 1 is adapted to rotate with pawl 5 around the same shaft 6, as has been described above. According as to whether said crank is held fixed by an external force as shown in Fig. 7 or whether it can move freely as shown in Fig. 8 so the pawl 5 is either moved out of the path of the ratchet teeth 37 in opposition to the action of the spring 39 or the pawl 5 under the action of the spring 39 is moved freely into one of the notches against a ratchet tooth 37.

The crank 7 is controlled by means of a rod 24 which is slidably guided in a bracket 31 secured to one of the wheel spokes 28 and connected to a weight 25 arranged to slide in the casing 27. The latter is secured by screws 32 and 32' to the spoke 28. As the weight moves together with the road wheel it will be displaced in the casing by centrifugal force in opposition to a spring 26, and this displacement will cause the crank 7 to be operated and the wheel 2 to be coupled to the member 1 for driving the latter at top speed. The speed at which this coupling takes place is determined by the spring 26 the compression of which can be regulated by means of a screw 29 and a lock nut 11. As the movement of the machine slows down, the spring 26 depresses the weight and causes the wheel 2 to be released whereupon the propulsion will again be carried out by means of the bottom gear. There is also a screw 30 by means of which the weight can be secured to the casing 27 for driving permanently either by means of the wheel 2 or by means of the wheel 12.

It should be noted that all the parts described may be differently shaped, and they may be used in combination or association with other operating parts or they may be replaced by equivalent parts without interfering with the essential features of this invention, and I desire to have it understood that such variance falls within the scope of the appended claims.

What I claim is:—

1. A transmission gear for vehicles and the like comprising a pair of toothed wheels of different diameters having equally pitched marginal teeth, means for supporting the wheels in juxtaposition and in axial parallelism with the teeth of one wheel in register with those of the other wheel at one portion of the circumference, a driving member engaging the registering teeth of the wheels, a driven member arranged concentrically with the smaller wheel and rotatably relative thereto, a freely rotating supporting ring arranged concentrically with the larger wheel, a coupling member arranged between and engaging the driven member and the ring for transmitting motion from one to the other, a free-wheel coupling operative to transmit motion from the larger wheel to the supporting ring, and means for coupling the smaller wheel to the driven member.

2. A structure as claimed in claim 1 wherein the coupling member comprises a disc having radial grooves arranged at one side of the disc at right angles to grooves on the other side, and keys on the driven member and on the ring engaging slidably in said grooves.

3. A structure as claimed in claim 1 wherein the support for the larger wheel and its ring comprises a boss and an axle whereon said boss occupies an eccentric position, the driven member being concentric with said axle.

4. A structure as claimed in claim 1 wherein the means for coupling the driven member to the smaller wheel comprises a pawl mounted in the driven member and operative to engage the wheel, a crank arm for operating the pawl, an operating rod engaging said crank and arranged to participate in the movement of the driven member, and means for actuating said rod while said member is in motion.

5. A structure as claimed in claim 1 wherein the means for coupling the driven member to the smaller wheel comprises a pawl mounted in the driven member and operative to engage the wheel, a crank for operating the pawl, an operating rod engaging said crank and arranged to participate in the movement of the driving member, and a centrifugally acting, spring-controlled member engaging said rod and operative to couple the wheel to the driven member at a given rate of motion of the latter.

6. A transmission gear for vehicles comprising a pair of sprocket wheels of different diameters having equally pitched sprocket teeth, means for supporting the wheels in juxtaposition in contact with each other and in axial parallelism with the teeth of one wheel in register with those of the other wheel at one portion of the wheel circumference, the teeth of one wheel being complementary to those of the other wheel, a driving chain engaging the registering teeth of the two wheels, a driven member arranged concentrically with and supporting the smaller wheel, a freely rotatable supporting ring arranged concentrically with the larger wheel, a rotatable disc arranged between said ring and the driven member and provided on both sides with radial grooves, the grooves at one side of the disc being at right angles to those of the other side, keys on the ring and on the driven member engaging slidably in said grooves for coupling the elements together, a free-wheel coupling operative to impart movement from the larger wheel to the supporting ring in one direction, a pawl for coupling the driven member to the smaller wheel, and means for operating the pawl.

7. A structure as claimed in claim 6 wherein the driven member is secured to the hub of a spoked wheel and wherein the means for operating the pawl comprises a crank and a rod supported slidably on one of the wheel spokes.

8. A structure as claimed in claim 6 wherein the driven member is secured to the hub of a spoked wheel and wherein the means for operating the pawl comprises a crank, a rod supported slidably on one of the wheel spokes, and a centrifugally acting, spring-controlled weight connected to said rod and operative to act thereon for coupling the driven member to the wheel at a given rate of motion.

9. A structure as claimed in claim 6 wherein the driven member is secured to the hub of a spoked wheel and wherein the means for operating the pawl comprises a crank, a rod supported slidably on one of the wheel spokes, a centrifugal, spring-controlled weight connected to said rod and operative to act thereon for coupling the driven member to the smaller wheel at a given rate of motion, and means for securing the rod to the spoke with the pawl either in or out of operative engagement with the wheel.

IVO MARTELLI.